United States Patent
Tickler et al.

(10) Patent No.: US 12,455,710 B2
(45) Date of Patent: Oct. 28, 2025

(54) TRANSFER OF PRINT JOBS BETWEEN PRINT QUEUES

(71) Applicant: NT-WARE SYSTEMPROGRAMMIERUNGS-GMBH, Bad Iburg (DE)

(72) Inventors: Chris Tickler, Harpenden (GB); Stephen Jobes, Düsseldorf (DE); Peter Lange, Bad Oeynhausen (DE)

(73) Assignee: NT-WARE SYSTEMPROGRAMMIERUNGS-GMBH, Bad Iburg (DE)

( * ) Notice: Subject to any disclaimer, the term of this patent is extended or adjusted under 35 U.S.C. 154(b) by 0 days.

(21) Appl. No.: 18/263,307

(22) PCT Filed: Jan. 28, 2022

(86) PCT No.: PCT/EP2022/052049
§ 371 (c)(1),
(2) Date: Jul. 27, 2023

(87) PCT Pub. No.: WO2022/162145
PCT Pub. Date: Aug. 4, 2022

(65) Prior Publication Data
US 2024/0086131 A1  Mar. 14, 2024

(30) Foreign Application Priority Data
Jan. 29, 2021 (GB) .................................. 2101279

(51) Int. Cl.
*G06F 3/12* (2006.01)

(52) U.S. Cl.
CPC .......... *G06F 3/1288* (2013.01); *G06F 3/1203* (2013.01); *G06F 3/126* (2013.01); *G06F 3/1274* (2013.01)

(58) Field of Classification Search
None
See application file for complete search history.

(56) References Cited

U.S. PATENT DOCUMENTS

2015/0242168 A1*  8/2015  Yu .......................... G06F 3/1203
                                                         358/1.13
2015/0339082 A1* 11/2015  Yeung .................... G06F 3/1285
                                                         358/1.15
(Continued)

FOREIGN PATENT DOCUMENTS

EP  2378411 A2 * 10/2011  ........... G06F 3/1203
EP  3742279 A1 * 11/2020  ........... G06F 3/1275
(Continued)

*Primary Examiner* — Akwasi M Sarpong
*Assistant Examiner* — Pawan Dhingra
(74) *Attorney, Agent, or Firm* — Canon U.S.A., Inc. IP Division

(57) ABSTRACT

A printing system includes a cloud service including a first print job queue, a print server including a second print job queue, and a client computer. The client computer sends print information to the cloud service via a second network in accordance with a print instruction from a user. The cloud service creates a print job from the print information, stores the print job in the first print queued, and sends the print job stored in the first print queue to the print server via a first network. The print server stores the print job in the second print queue.

13 Claims, 8 Drawing Sheets

(56) References Cited

U.S. PATENT DOCUMENTS

| | | | |
|---|---|---|---|
| 2020/0364010 A1* | 11/2020 | Inoue | G06F 3/1204 |
| 2021/0165620 A1* | 6/2021 | Morita | G06F 3/1288 |
| 2022/0179604 A1* | 6/2022 | Yasuda | G06F 3/1225 |

FOREIGN PATENT DOCUMENTS

| | | | | |
|---|---|---|---|---|
| GB | 2486629 A * | 6/2012 | | G06F 3/1292 |
| JP | 2011227624 A | 11/2011 | | |
| JP | 2015014954 A | 1/2015 | | |
| JP | 2019057146 A | 4/2019 | | |
| JP | 2020187700 A | 11/2020 | | |
| WO | WO-2020152257 A1 * | 7/2020 | | G06F 3/1226 |

* cited by examiner

TRANSFER OF PRINT JOBS BETWEEN PRINT QUEUES

CROSS-REFERENCE TO RELATED APPLICATIONS

This application is the National Phase application of PCT Application No. PCT/EP2022/052049, filed on Jan. 28, 2022 and titled "A Printing System and a Method of Printing". This application claims the benefit under 35 U.S.C. § 119(a)-(d) of United Kingdom Patent Application No. 2101279.4, filed on Jan. 29, 2021 and titled "A Printing System and a Method of Printing". The above cited patent applications are incorporated herein by reference in their entirety.

TECHNICAL FIELD

The present invention relates to a printing system and a method of printing.

BACKGROUND OF THE INVENTION

It is known that multiple printers, or more typically multifunctional apparatuses or multifunction peripheral devices (MFP's), can be managed using a print server. The print server may be installed within an internal network of a company or organization. When printing is instructed by a user operating a computer, print data is transmitted from the computer to the print server and spooled therein. Then, when printing is instructed by the user operating a desired MFP, the spooled print data is transmitted from the print server to the desired MFP, and printing is performed.

A more recent trend is to move services that have been provided by local servers to the "cloud". Such services are typically accessed via the internet, and this is referred to as a cloud service. The cloud service can be considered a virtual server, due to the server functionality in fact being provided by any one of a plurality of online servers. Such a plurality of online servers is often referred to as a cloud, due to being located externally and remotely from the network. Thus, it is appropriate in this context to refer to an MFP being configured to exchange information with a cloud service. A cloud service can also be considered as a software (application) platform that provides an abstraction layer on top of the server (physical or virtual) layer. This is often referred to as true cloud (rather than hosted or virtualised servers). True cloud software is written to run on the platform and request, or release, resources as required. Existing or traditional server-based software is able to run on hosted, or virtualised, servers but are bound by the limits of resources of each individual server(s) often resulting in the requirement to manage multiple servers.

It may be beneficial in some arrangements to use a combination of a local server and a cloud service. For example, in the case that a company or an organization has a headquarters (HQ) office and a branch office, it may be desirable that printing at the HQ office is performed by using a print server installed within the HQ internal network (a local print sever), whereas printing at the branch office may be performed by using a cloud service. This may be because in the HQ office print volume is likely to be large, and thus it may be worth having its own print server. On the other hand, in the branch office, print volume is not likely to be as large as the HQ office, and so it is not worth having its own print server. There are many other reasons that it may be desirable to use a local (internal) print server in one location and a cloud (external) service to service print needs in another location, such as security requirements for data being printed. Other reasons for wishing to use a local print server include: where additional processing of the print job is required; where connecting to a local print server and/or obtaining input from a local system is desirable before printing; where it is necessary to have local triggers to release the print job in a different location (e.g. if the print job is over a specific number of pages/copies, or special finishing requirements, like book binding, are needed); where the increased security of keeping print jobs inside a corporate network is desirable; and where some print jobs are very large and take a long time to download through limited bandwidth internet connections (e.g. when connected to a cloud service). A cloud service often includes more methods of accepting a print job (such as "drag-and-drop"), or can interact with more types of client software, than the local server, and so these are other reasons why a cloud service may be desirable. Moreover, it may also be desirable for a user to be able to access both a local server and a cloud service from one location.

However, budget (cost) control is usually dealt with by an on-premise local server, and when using the arrangement of the combined local sever and cloud service, it is difficult to accurately perform budget control at the local server when a user uses the cloud service to print. On the other hand, as mentioned above, a cloud service often includes more methods and/or software of accepting a print job than the local server, and thus, a user that is used to submitting jobs using one method and/or or client software with the cloud service, may find it difficult or inconvenient when printing using the on-premise local server.

SUMMARY OF THE INVENTION

According to a first aspect of the present invention a printing system is provided as set out in claims 1 to 7.

BRIEF DESCRIPTION OF THE DRAWINGS

Embodiments of the present invention will now be described, by way of example only, with reference to the accompanying figures.

DESCRIPTION OF THE EMBODIMENTS

Each of the embodiments of the present invention described below can be implemented solely or as a combination of a plurality of the embodiments or features thereof where necessary or where the combination of elements or features from individual embodiments in a single embodiment is beneficial.

First Embodiment

Figure 1:
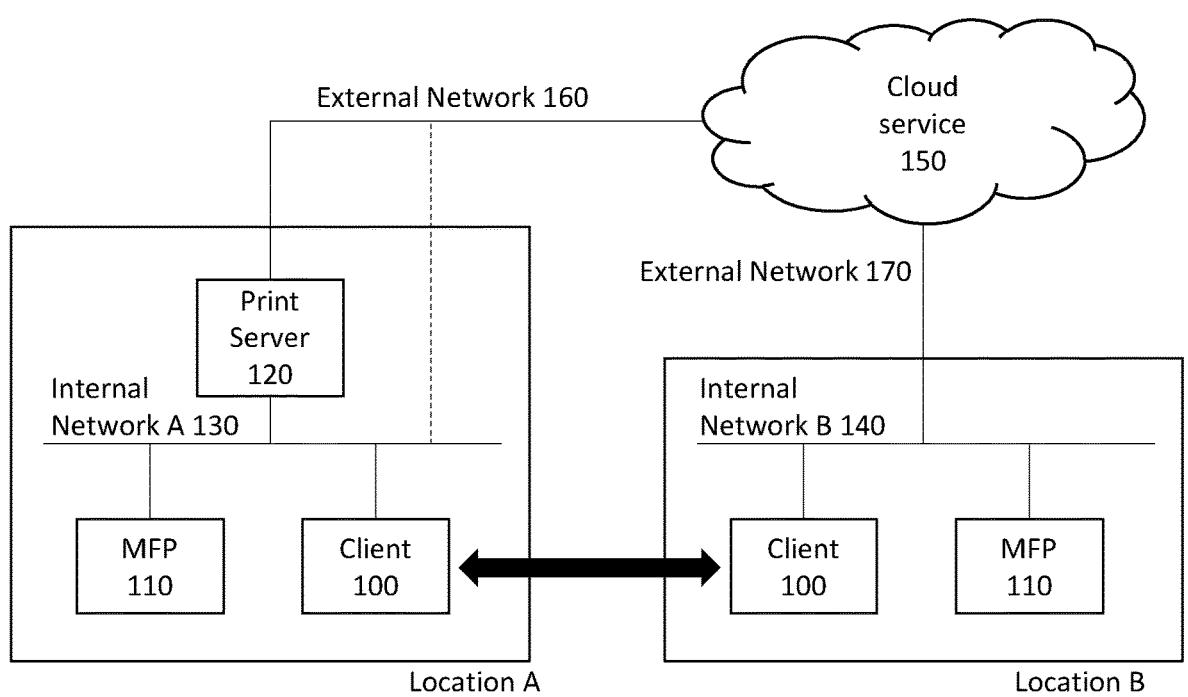
FIG. 1 illustrates an example of a printing system.

FIG. 1 illustrates a printing system including two geographical locations, location A and location B. Location A may be a Head Quarters (HQ) Office of an organization, and location B may be a Branch Office (BO) of the organization. However, the present invention is not limited to these locations, any two locations using different printing methods (as explained in more detail below) would suffice. For example, locations A and B may be various university or school site locations.

In location A, a print server 120 and an MFP 110 are provided, and these are connected to each other via an internal network 130 (hereinafter referred to as internal network A). A client computer 100 can also be connected to the internal network A 130, and communicate with the print server 120 and the MFP 110 via the internal network A 130. The print server 120 can communicate with a cloud service 150 via an external network 160. As shown by the dashed line in FIG. 1, in some arrangements the client 100 and MFP 110 may communicate with the cloud service 150 without having to communicate with the print server 120.

In location B, an MFP 110 is connected to an internal network 140 (hereafter referred to as internal network B). The client computer 100 can also be connected to the internal network B 140, and it can communicate with the MFP 110 via the internal network B 140. Both the MFP 110 and client 100 are connected to the cloud service 150 via the internal network B 140 and an external network 170.

In each location the MFP 110 may be considered as a printing apparatus and/or a copying apparatus, or as a multifunctional apparatus. The MFP 110, instead of being a multifunctional apparatus, may be a single functional device that, for example, prints only. The MFP may also include facsimile functions.

The client computer 100 does not need to be connected to the internal network A 130 (in location A) or the internal network B 140 (in location B), it can instead be connected to a sister internal network or external network (not shown). It is not necessary for the client computer 100 to be able to communicate with the MFP 110, in some embodiments it is only necessary that the client computer 100 and the MFP 110 are connected to, and communicable with or via, the server 120 (in location A) or cloud service 150 (in location B).

The internal network A 130 and internal network B 140 can be a wired network or a wireless network, and they may simply be called a "network" or a Local Area Network (LAN). The external networks 160 and 170 are typically the internet. The internal network A 130 and internal network B 140, and the external networks 160 and 170 may be connected via a router (not shown).

The number of client computers 100 and MFP's 110 is not limited. Each location may include a plurality of MFP's 110 and client computers 100.

The arrow in FIG. 1 between location A and location B shows that the client computer 100 can be carried between these locations.

The client computer 100 is an example of an information processing apparatus and is typically a general-use personal computer (PC). The PC may be a desktop computer or a laptop-computer. The client computer 100 is not limited to be being a PC. The client computer 100 may be a mobile telephone, tablet device, or any electronic device that allows a user to select data to be printed.

Figure 2:
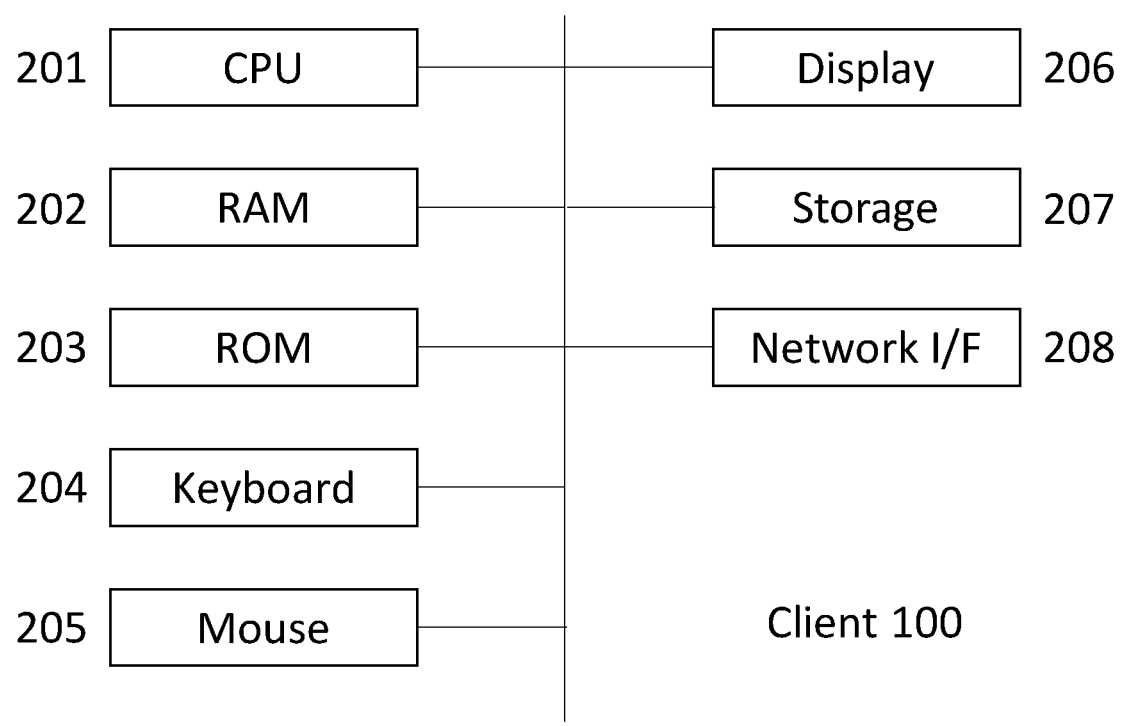
FIG. 2 illustrates an example of a hardware configuration of a client computer.

FIG. 2 shows selected standard components that may be present in the client computer 100 when the client computer is a PC. The client computer 100 has for example a CPU (Central Processing Unit) 201, a RAM (Random Access Memory) 202, a ROM (Read Only Memory) 203, a keyboard 204, a mouse 205, a display unit 206, an external storage device 207, and a network interface 208 which are all connected to each other via a bus. It is not necessary that all the components shown in FIG. 2 are present in the client computer 100 (for example, the ROM 203 may be a software ROM).

The CPU 201 is a standard processor such as those available from Intel®, ARM®, or AMD®. The RAM 202 is a conventional RAM and is used as a temporary storage area for instructions being processed by the CPU 201. The ROM 203 is a memory that stores certain applications such as a document creation application for use by the client computer 100. The keyboard 204 and mouse 205 form input devices for the client computer 100 in a conventional manner. The display unit 206 is a display for providing output display for a user. The external storage device 207 may be a removable USB hard disk drive or flash memory. Network interface 208 is a set of standard components that allows the client computer 100 to communicate over the internal networks A 130 and B 140. Such client computers are well known in the art and may include additional components (video cards etc.) or other components. In the case where the client computer 100 is a mobile telephone or tablet device (or other such portable device), the keyboard 204 and mouse 205 may take the form of a touchpad or touchscreen (or any other suitable input device) on the device. Voice recognition may also be used as an input device.

Figure 3:
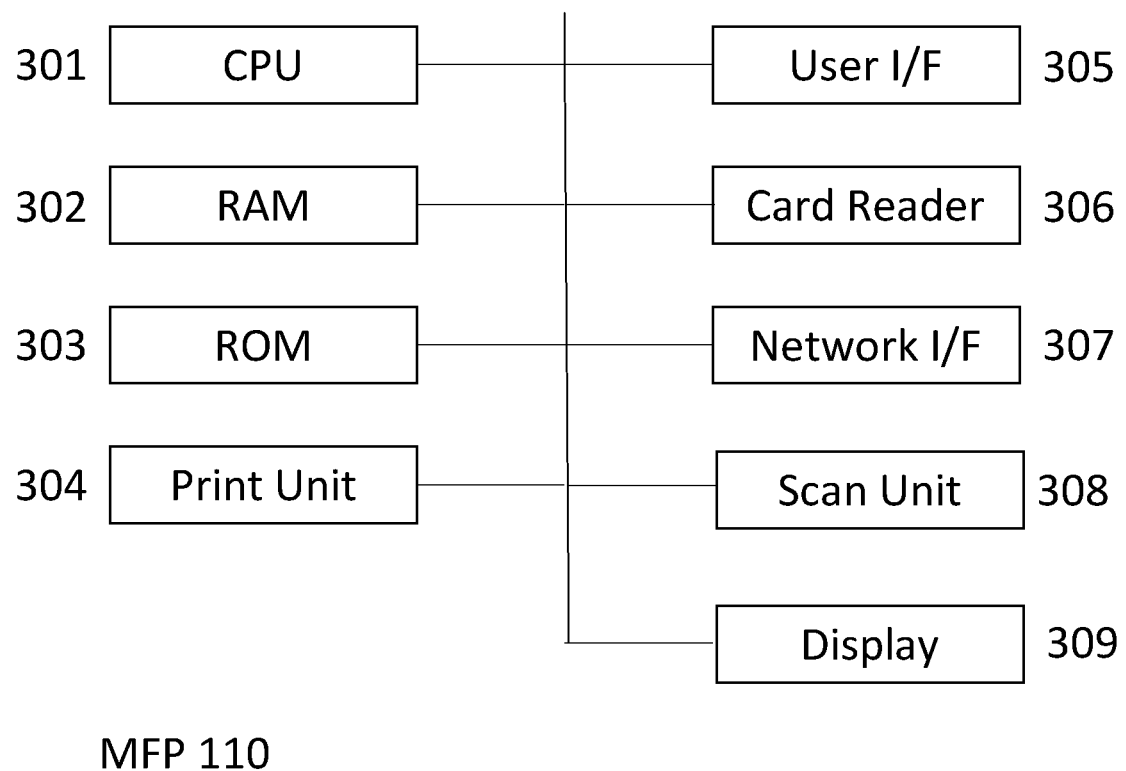
FIG. 3 illustrates an example of a hardware configuration of a multifunction peripheral.

FIG. 3 shows selected standard components that are present in the MFP 110. The MFP 110 has a CPU 301, a RAM 302, a ROM 303, a print unit 304, a user input/output 305, a card reader 306, a network interface 307, a scan unit 308, and a display 309 which are all connected to each other via a bus.

The CPU 301 is a standard processor such as those available from Intel® or AMD®. The RAM 302 is a conventional RAM and is used as a temporary storage area for instructions being processed by the CPU 301. The ROM 303 is a memory that stores certain applications for use by the MFP 110, such as the BIOS. The CPU 301 comprises a user interface generation unit that generates the user interface, which is then displayed by the display 309 of the MFP 110.

The print unit 304 could be implemented by an electrophotographic type printer engine or an inkjet type printer engine, and it can print an image on a printing media such as a paper based on the provided data. The scan unit 308 comprises hardware configured to capture the image of a document to be scanned.

The user input/output 305 includes a plurality of hardware buttons and software buttons which the user can select to provide input to the MFP 110. The user input/output 305 includes a touch screen as part of the display 309. The user input/output 305 includes a keyboard which can be used to enter alphanumeric text such as user ID and password information. Thus, the keyboard is a physical keyboard or a virtual keyboard. The display 309 includes a LCD display, together with touch sensors which provide touch screen functionality.

The user provides the MFP 110 with authentication information, in order to access services that are available from the MFP 110. For registered users, the authentication information corresponds to identification information, which associates the user with a user account.

The card reader 306 reads out user ID information from a contactless card. The readout ID is used to identify or authenticate the user who is operating the MFP 110. The user ID can be input into the MFP 110 by using a keyboard instead of the card reader 306. The authentication of the user can be performed in cooperation with a separately installed authentication server which is provided within each internal network A 130 (location A) and internal network B 140 (location B).

Network interface 307 is a set of standard components that allows the MFP 110 to communicate over the internal network A 130 (location A) and internal network B 140 (location B). Thus, the network interface 307 comprises an input unit and an output unit, which can be used by the MFP 110 to communicate with the client computer 100 and the server 120 (location A) and cloud service 150 (location B).

Figure 4:
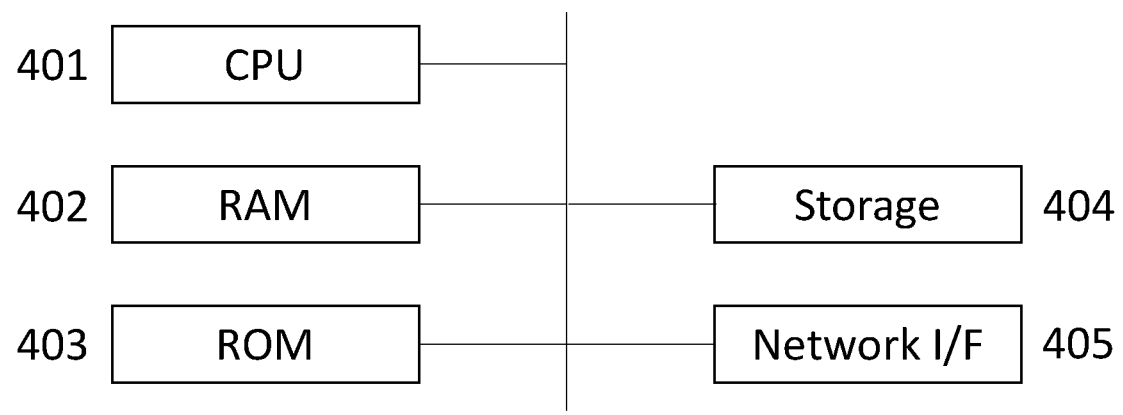
FIG. 4 illustrates an example of a hardware configuration of a print server.

FIG. 4 shows selected standard components that are present in the print server 120. The print server 111 includes a CPU 401, a RAM 402, a ROM 403, a storage 404, and a network interface 405 which are all connected each other via a bus. It is possible for those components of the print server 120 to be either distributed to multiple physical locations or integrated in a single housing.

The CPU 401 is a standard processor such as those available from Intel® or AMD®. The RAM 402 is a conventional RAM and is used as a temporary storage area for instructions being processed by the CPU 401. The ROM 403 is a memory that stores certain applications for use by the print server 120, such as the BIOS. The storage 404 is a hard disk drive. Network interface 405 is a set of standard components that allows the print server 120 to communicate over the internal network A 130 or the Internet.

Figure 5:
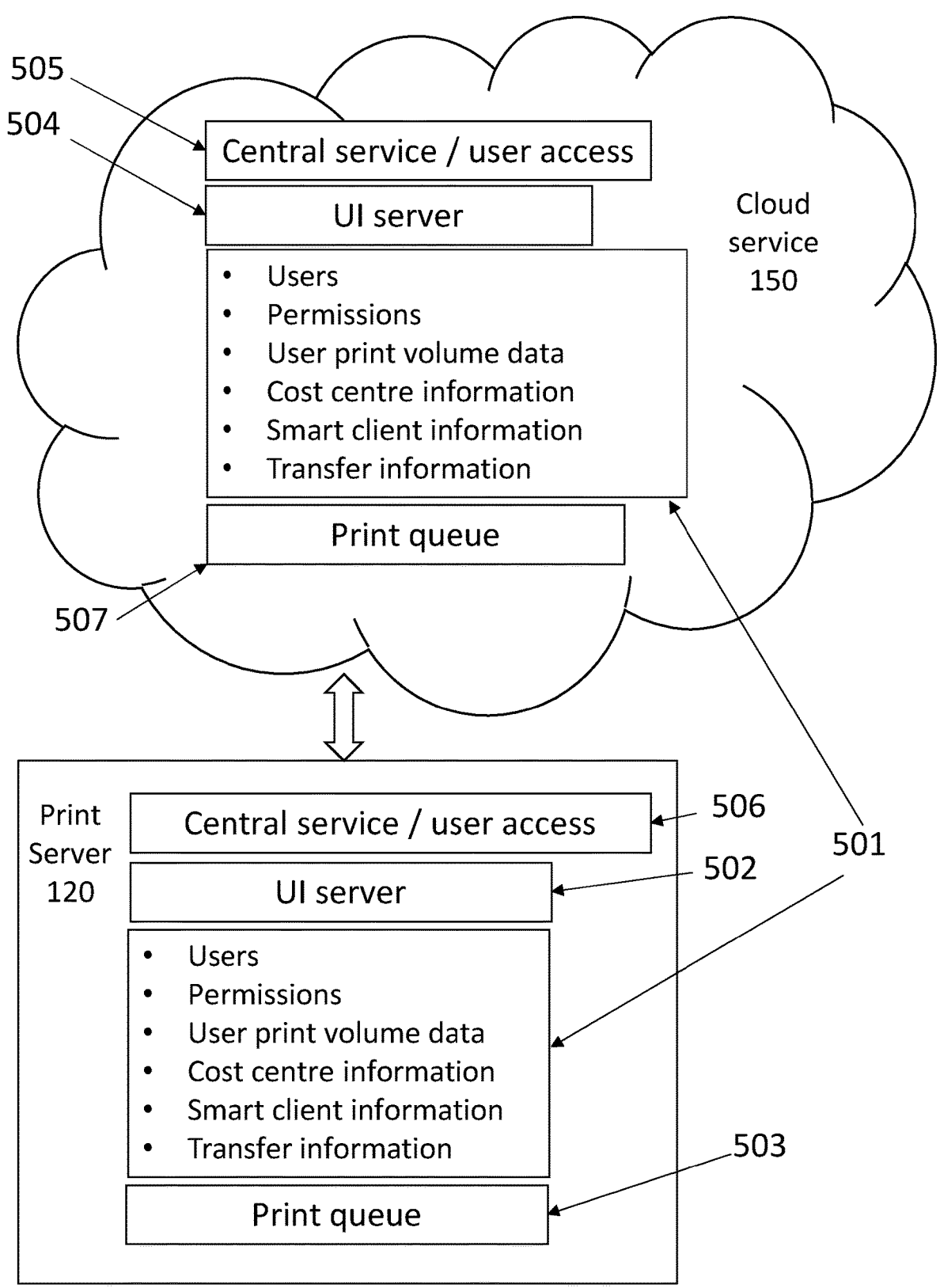
FIG. 5 illustrates an example of the services available on a cloud service and the print server.

FIG. 5 illustrates an example of the functions available on the cloud service 150 and the print server 120, and illustrates communication between the cloud service 150 and the print server 120. The cloud service 150 may be considered as a type of "server". In this application, "server" includes a physical server, an application server, a cloud service provided on hosted or virtualised servers, or a true cloud service. The functions on the cloud service 150 are typically provided by software applications running on one or more servers.

There is an exchange of information 501 between the cloud service 150 and the print server 120. In particular, at the time when the print server 120 is being set up in location A, the print server 120 is configured with a connection to the cloud service 150. The print server 120 is registered with the cloud service 150 with a user account (e.g. XYZ corporation). Thereafter, the information 501 is periodically synchronized between the print server 120 and the cloud service 150.

The information 501 may include the identities of registered users of the print system illustrated in FIG. 1. The idea of registered users in a print system is known in the printing field and consists of those users who are registered within an authentication function of the print system. The registered users may have differing authorizations, e.g. permission to print, scan or perform other operations within the print system. Not all users may have the same permissions.

The user identities and permissions are also shared/synchronized between the cloud service 150 and the print server 120. As a consequence, a registered user may log in to each of the cloud service 150 and the print server 120. Further, changes made by an administrator to permissions or to add/remove registered users are kept up-to-date in the cloud service 150 and print server 120 by virtue of this synchronization. The synchronization may be performed according to a determined schedule, upon detection of a change in the data at either the cloud service 150 or the print server 120, or by any other method.

In addition to the identity of the registered users, permissions of the users (e.g. print permissions such as printing single/duplex or the ability to print colour/black and white), information about the print history of the user (e.g. volumes printed by the user etc.) and cost centre information (cost centre information allocated by a user against certain print or scan activities) may be synchronized between the print server 120 and the cloud service 150.

FIG. 5 shows a central service and user access function 505 on the cloud service 150 and a central service and user access function 506 on the print server 120 (each shown in a single central service/user access block for illustrative convenience). The central service of the cloud service 150 and the central service of the print server 120 may be configured to provide configuration information to a smart client of the client computer 100 (discussed later). The user access function includes a database storing the identity of the registered users and print permissions mentioned above. When a request is received from a client computer 100 to access the cloud service 150, the user access function 505 checks the received user name and password or other authentication information such as a token against the database of registered users and only allows access to further functions of the cloud service 150 if the user name and authentication match a registered user. Similarly, the user access function 506 of the print server 120 checks a received user name and password or other authentication information such as a token against the database of registered users and only allows access to further functions of the print server 120 if the user name and authentication match a registered user.

FIG. 5 further shows two additional features of the print server 120. The first is UI (User Interface) server software 502, which is provided on the print server 120 to provide UI display screens to the MFP 110 in location A. The second is a print queue 503 for storing print jobs for printing. The cloud service 150 also has a UI server function 504, and the MFP 110 in location B is configured to be served UI pages from the cloud service 150. The cloud service 150 further includes a print queue 507 for storing print jobs for printing.

While a user is located in location A they can use a "first printing method". When they wish to print a document that has been created, or stored, on client computer 100, the client 100 sends print data and attribute information relating to the document/data to be printed to the print server 120. The transmitted print data and attribute information is used by the print server 120 to create a print job and this is then spooled and stored in the print queue 503 on the print server 120. A user then logs into the MFP 110 in location A. Once the user has successfully logged into the MFP 110, the user is allowed to use the functions of the MFP 110. One of the functions of the MFP 110 is "print", and when the user selects "print", the MFP 110 requests the print server 120 for a list of the print jobs stored in the print queue 503 belonging to the logged in user. The requested list of print jobs is transmitted from the print server 120 to the MFP 110, and the print job list is displayed on the display screen 309 of the MFP 110. The user then selects a print job using the user interface 305, and the MFP 110 sends a request to the print server 120 to print the selected print job. The print server 120 sends the print data for the selected print job from the print job queue 503 to the MFP 110, and then printing is performed at the printer unit 304 of the MFP 110 based on print job data received from the print server 120.

While a user is located in location B they can use a "second printing method". This is a similar process to that described above, except that the "function" of the print server 120 is replaced with the cloud service 150. In other words, the client computer 100 sends the print data and attribute information relating to the document/data to be printed to the cloud service 150, and the transmitted print data and attribute information is used by the cloud service 150 to create a print job, and this is then spooled and stored in the print queue 507 on the cloud service 150. The MFP 110 requests the cloud service 150 for a list of the print jobs stored in the print queue 507 belonging to the logged in user. The requested list of print jobs is transmitted from the cloud service 150 to the MFP 110, for display on the display screen 309 of the MFP 110. The MFP 110 sends a request to the cloud service 150 to print the selected print job, and the cloud service 150 sends the print data for the selected print job from the print job queue 507 to the MFP 110, where printing is performed.

In many cases the cloud service 150 offers many methods of print submission that are not available to the print server 120. Furthermore, often a cloud service 150 can interact with more software applications than the local print server 120. These print submission methods include drag-and-drop, Universal Print, Chrome Extension, iOS/Android. However, often there is a requirement for these types of jobs to be put through a standard workflow on the print server 120 so that functionality such as on-premise budget control can be used.

The embodiment described herein provides an arrangement where print data that is currently stored in the print queue 507 of the cloud service 150 can be transferred to the print queue 503 of the print server 120 for subsequent printing. This means that full budget control can be performed even if a user submitted their print jobs to the cloud service 150.

Figure 6:
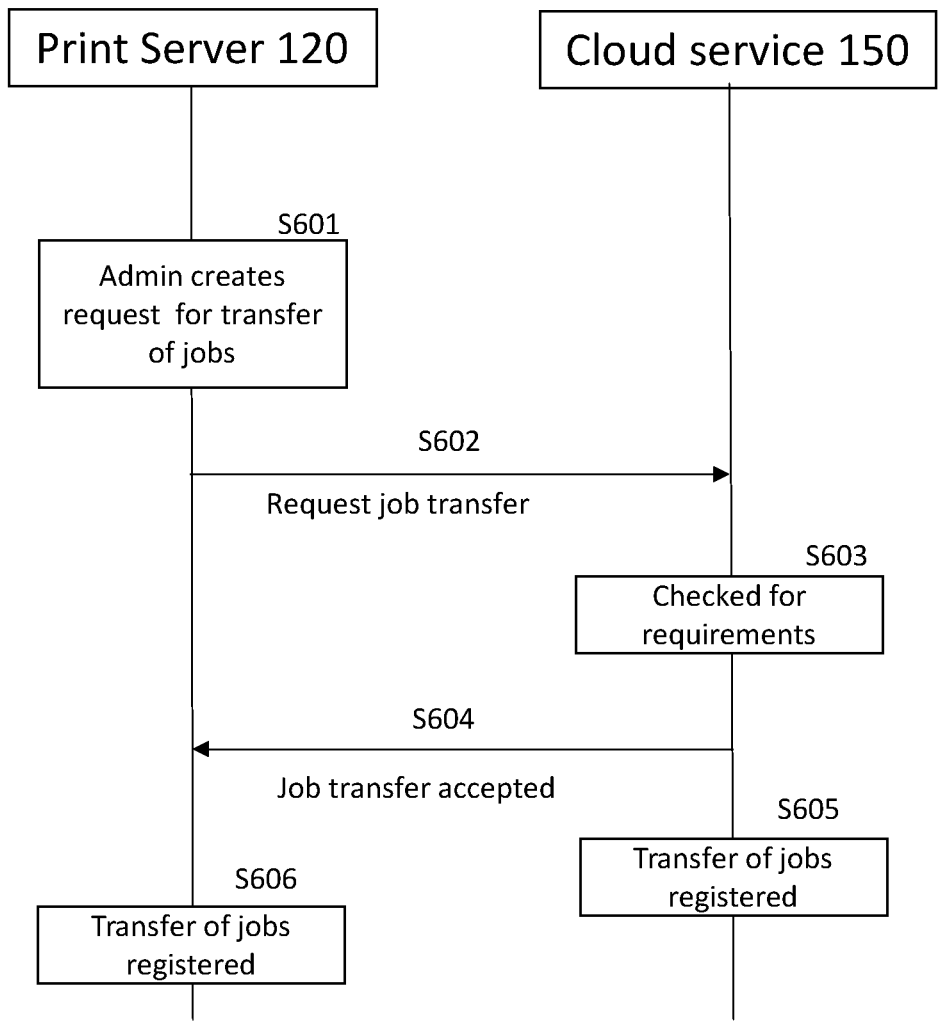
FIG. 6 is a sequence diagram showing the process flow for setting transfer of print jobs from the cloud service to the print server.
Figure 7:
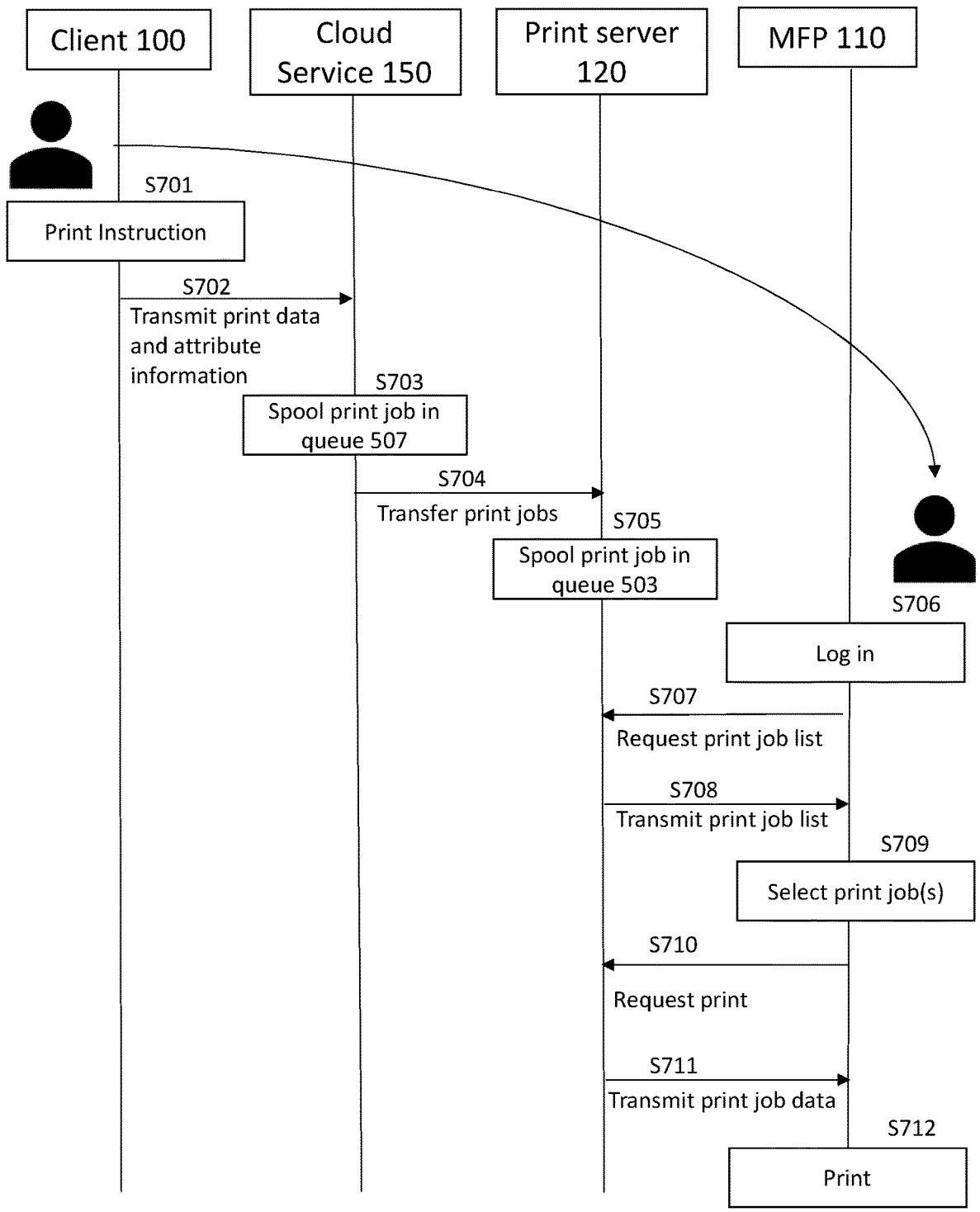
FIG. 7 is a sequence diagram showing the process flow for printing in the printing system.
Figure 8:
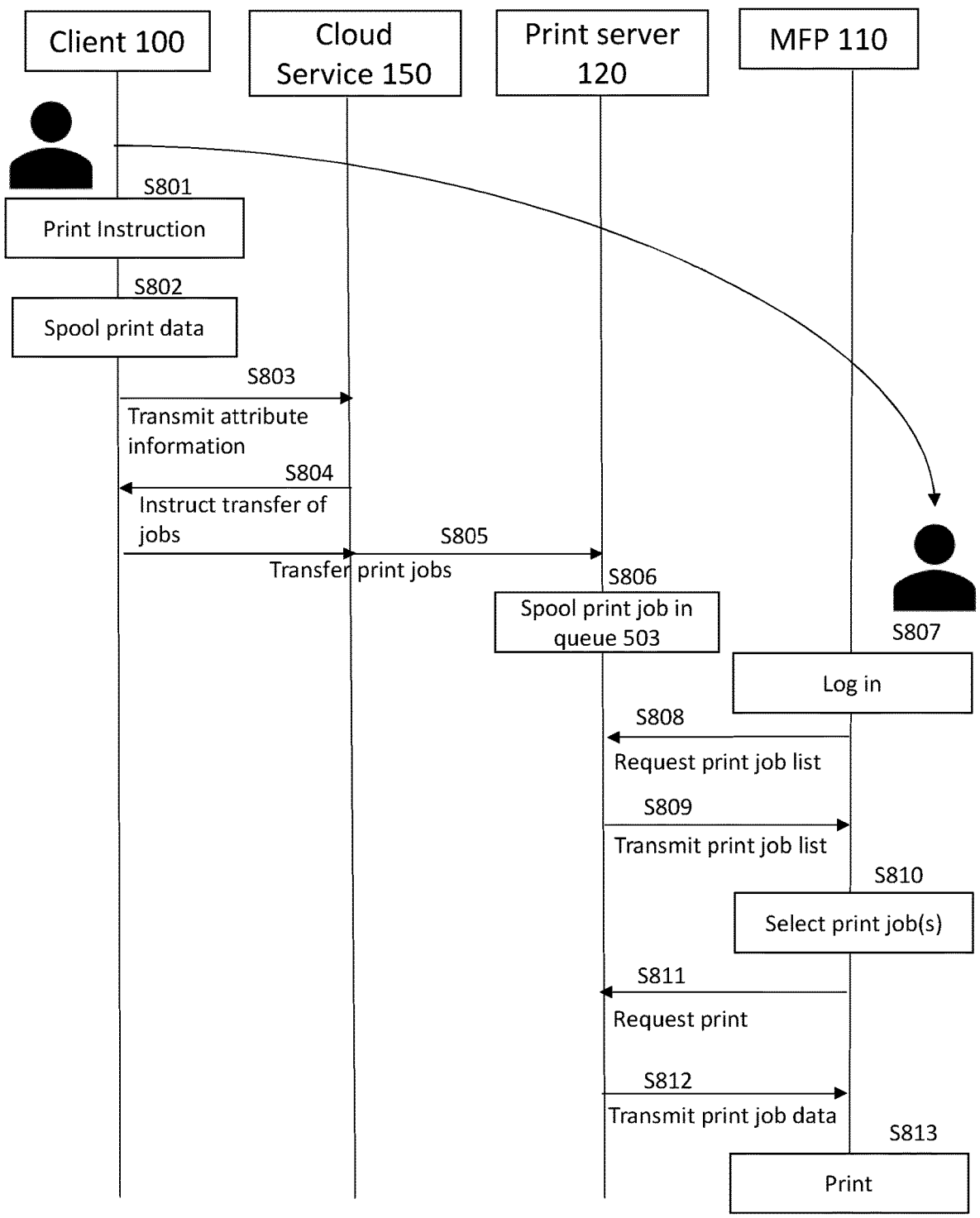
FIG. 8 is a sequence diagram showing an alternative process flow for printing in the printing system.

The skilled person will understand that the print work flows now described below with reference to FIGS. 6 to 8 are illustrative, and the print workflows may be varied according to needs.

FIG. 6 shows a workflow performed by an administrator to set-up the transfer of jobs from the cloud service 150 to the print server 120.

In step S601 the administrator creates a request for transfer of jobs. The request for transfer of jobs is a request to set-up a workflow such that an "input" of the workflow of the print server 120 is the cloud service 150. Such a workflow means that, once transfer of jobs is set, for users that are registered in both the print server 120 and cloud service 150, print jobs stored in the print queue 507 of the cloud service 150 are downloaded from the cloud service 150 to the print server 120. As part of the request for transfer of jobs, if it hasn't already, the print server 120 connects to the cloud service 150, and, if necessary, the print server 120 authenticates with the cloud service 150. In step S602 the print server 120 sends the transfer of jobs request to the cloud service 150 via external network 160. In step S603 the cloud service 150 checks whether it can accept the request for transfer of jobs. If the cloud service 150 has received a similar request from another print server then it may decline the request. Assuming that the cloud service 150 can accept the request, in step S604 the cloud service 150 sends a confirmation to the print server 120, and in step S605 it registers the transfer request as transfer information in information 501. In step S606 the print server 120 also registers successful setting-up of the transfer of jobs as transfer information in information 501. In an alternative embodiment, the request for transfer of jobs may include the setting of various parameters such as identity of users, whether to accept either PCL or PDF documents, and options on budget control.

The transfer information stored in steps S605 and S606 may indicate that all jobs for a particular user are to be transferred to the print server 120, or may indicate that only certain jobs for a particular user are to be transferred. The transfer information may also indicate that all print jobs for all users that are stored in the print queue 507 of the cloud service 150 are to be transferred to the print server 120.

FIG. 7 shows a sequence diagram illustrating a printing method performed when jobs are transferred from the cloud service 150 to the print server 120. In the described arrangement, a user is initially located in location B and sends a print instruction to cloud service 150. The user then moves to location A to print the document using print server 120. This arrangement is not the only possible arrangement. The user located in location A may have access to both the print server 120 and the cloud service 150 (as shown by the dashed line in FIG. 1), and because of software running on the client computer 100, or because of the type of document to be printed, may need to send their print instruction to the cloud service 150. In this later case, the user does not need to move between location A and location B.

In step S701, the user operating the client computer 100, and wishing to print a document, instructs to print data. This instruction can be issued by an editing program installed in the client computer 100. Such an application includes but is not limited to a word processing application, spreadsheet software, picture editing software and a web browser. The document that the user wishes to be printed may be stored on the client computer 100, or stored on a cloud-based storage system that the client computer 100 (or cloud service 150) has access to.

The client computer 100 sends an access request (not shown) to the cloud service 150. The access request includes user identification and authentication information which is processed by the user access function 505 of the cloud service 150. The user access function 505 checks the received identification and authentication information. If the information corresponds to that of a registered user, the access request is successful. The user access on the client 100 may be performed before the user decides to print a document.

If the user access request is successful, in step S702, print data and attribute information relating to the document/data to be printed is transmitted from the client computer 100 to the cloud service 150. The transmitted print data and attribute information is used by the cloud service 150 to create a print job and this is then spooled and stored in the print queue 507 on the cloud service 150 in step S703. The attribute information may include information such as the identity of the user who requested the printing and information about print settings, such as number of pages, number of copies, black and white or colour printing, duplex printing, paper/media type, paper size, stapling options, finishing etc. The attribute information may include any information that is related to a user and/or print data.

Step S703 may include converting, by the cloud service 150, the print data from a generic PCL file format in which it was sent to the queue 507 by the client 100 into a print language that is accepted by an MFP 110. This conversion is performed by means of device information files (DIF files) stored on the cloud service.

In step S704 the print job that is spooled in print queue 507 in the cloud service 150 is transferred to the print server 120. In step S704, the cloud service is set to automatically transfer the print job to the print server 120 based on the transfer information saved in step S605. For example, once the print job is stored in print queue 507, the cloud service 150 checks the transfer information saved in step S605, and if the transfer information indicates that the print job is to be transferred to the print server 120, it then makes the transfer. Alternatively, the cloud service 150 may check the transfer information saved in step S605 before storing the print job in the print queue 507. The timing of the transfer of the print job from the print queue 507 in the cloud service 150 to the print queue 503 in the print server 120 may be as soon as it is available for transfer or as soon as it is determined that it needs to be transferred. Alternatively, the print job may be transferred at a certain timing, for example the next time that the print server 120 connects to the cloud service 150, or print jobs may be scheduled to be transferred at certain predetermined time intervals.

In an alternative embodiment, it may be the responsibility of the print server 120 to request the transfer of the print job from the cloud service 150. In this case, the print server 120 may be arranged to periodically send enquiries to the cloud service 150 to determine if a print job is stored in the print queue 507. Once the print server 120 is notified that there is a print job is stored in print queue 507, the print server 120 will determine whether it needs to request the transfer of the job based on the transfer information saved in step S606.

In step S705 the transferred print job is stored in the print queue 503 of the print server 120.

If in step S703 the cloud service 150 did not convert the print data from a generic PCL file format, this may now be performed in step S705 by the print server 120. The print server 120 converts the print data from a generic PCL file format in which it was sent by the client 100 into a print language that is accepted by the MFP 110. This conversion is performed by means of device information files (DIF files) stored on the print server 120.

Once the print job stored in print queue 507 in the cloud service 150 has been transferred to the print server 120, the print job that has been transferred is deleted from the print queue 507 in the cloud service 150. In other words, a print job that is transferred from the print queue 507 to the print server 120 is deleted from the print queue 507.

When the user wishes to print the desired document, if they were initially in location B they move to location A where an MFP 110 is located. The user logs into the MFP 110 for example by using a contactless card in step S706. This involves a request by the MFP 110 to the user access function 506 of the print server 120. The request may include a certificate, number or identifier related to the user's user account, that is obtained from the contactless card. Instead of using a contactless card, the user may log in to the MFP 110 using a username and password that are entered at the MFP 110, or by the MFP 110 reading biometric information, such as a fingerprint or image of a user's face. Alternatively, a mobile device may be used to log in. This may be achieved by entering of a username and password, or reading of biometric information (e.g. fingerprint reader), at the mobile device. Alternatively, the mobile device may use a mobile application and Bluetooth™ reader, or the user may log in by scanning a code (e.g. barcode or QR-code) with a mobile device. In the case of using a mobile device, an application running on the mobile device authenticates a user to the cloud service 150, and the cloud service 150 then authorises the user to use the MFP 110. Other suitable ways of logging-in may be used.

Once the user has successfully logged into the MFP 110 (i.e. the authentication of the user was successful), the user is allowed to use the functions of the MFP 110. One of the functions of the MFP 110 is "print", and when the user selects "print", in step S707 the MFP 110 requests the print server 120 for a list of the print jobs stored in the print queue 503 belonging to the logged in user. This list contains the names of print jobs having attribute information indicating that the print server 120 received the print job data and attribute information from the logged in user (via the cloud service 150).

In step S708, the requested print job list is transmitted from the print server 120 to the MFP 110. In step S709, the print job list provided by the print server 120 is displayed on the display screen 309 of the MFP 110. The names of print jobs are displayed on the display screen 309 so that the user can easily select the print job which he or she wishes to print.

In step S709, the user selects a print job using the user interface 305, and in step S710, the MFP 110 sends a request to the print server 120 to print the selected print job.

In step S711 the print server 120 sends the print data for the selected print job from the print job queue 503 in the print server 120 to the MFP 110.

If in step S703 the cloud service 150 did not convert the print data from a generic PCL file format, and in step S705 the print server 120 did not perform the conversion, this may now be performed in step S711 by the print server 120. The print server 120 converts the print data from a generic PCL file format in which it was sent by the client 100 into a print language that is accepted by the MFP 110. This conversion is performed by means of device information files (DIF files) stored on the print server 120.

In step S712, printing is performed at the printer unit 304 of the MFP 110 based on print job data received from the print server 120.

Although a single print job is described above, the embodiment is not limited to this. A user may instruct printing of a plurality of documents from client computer 100 to the cloud service 150, and the cloud service 150 will create and store a plurality of print jobs for the user in the print queue 507. Jobs will be transferred from the print job queue 507 to the print server 120 depending on the transfer information saved in steps S605/S606. Typically, the transfer information will indicate that all jobs for all users that are stored in the print queue 507 of the cloud service 150 are to be transferred to the print queue 503 of the print server 120. In step S709 the user may select one or more print jobs from the displayed print job list on MFP 110. If the user selects more than one print job, in step S710 the MFP 110 sends a request to the print server 120 for printing each of selected print jobs either separately or all of them at the same time.

In steps S701 the user may instruct the printing of a document(s), and client computer 100 may send the print data and attribute information to the cloud service 150, in various ways and using various software packages. In other words, the print job source could come from many different sources. This for example may include: a client computer using "smart client" (discussed below); "drag-and-drop"; email submission to the cloud service 150 email address; a client computer 100 configured with Microsoft Universal Printing; a client computer configured with a Chromebook/PC Chrome Browser; uploading of a file or picture with a mobile application email submission; a client computer configured with an iOS application; and a client computer configured with an Android application; importing a file/picture/data from Universal print; and importing a file/picture/data from Google Cloud Print.

In relation to FIG. 7, it has been described that a user's print job(s) is transferred from the cloud service 150 to the print server 120, where the user subsequently selects and prints their document from an MFP 110 which communicates with the print server 120. This type of action is commonly referred to as a "print workflow". The selection and printing of a print job at the MFP 110 is commonly referred to as "release" of a print job.

The embodiment is not limed to the print workflow and release of a print job at an MFP 110 by a user described above. Once the print job(s) has been transferred to the print server 120 and stored in the print queue 503, the print server 120 may be configured to perform one or more various workflows. For example, the print server 120 may be configured to perform one or more of the following print workflows:

- Budget control can be applied to the print jobs.
- PDF documents/data can be converted to PCL data.
- If a print job is a large print file, a user can be notified (e.g. via email) that the print job is downloaded and ready for release at a printer/MFP.
- Print job properties can be checked against a print policy, and if the print job is outside the print policy then an approval workflow is applied (e.g. printing single sides instead of double sided).
- Print job(s) can be routed to another print server in specific locations (such as schools/colleges sites), depending upon the user, the print job, or printer type. For example, the user may usually be located in another location (location C) where another local print server (with similar functionality to print server 120) is located. Thus, it makes sense to transfer all jobs for that user to a location where the user is most likely to be located for the print job to be released.
- Print jobs can be routed and/or delegated to a person or group/department. For example, large print jobs may be routed to a CRD (central reprographics department) in a company or school, a quote for the print job is sent via email and then the print job is approved and printed once payment is made.
- A customer specific billing process could be applied, and this could vary, for example, per person, per department, per location, and so on.
- A document can be printed on multiple printers in parallel. This print workflow would be applicable to fire/police departments printing emergency documents (possibly for distribution to the public); canteen menu printing; hospital patient data to be printed in different departments (e.g. radiology and cardiology), and so on.
- Manipulation of the print data. For example, adding a PJL or PS header to trigger device functionality, or printing a banner page.
- Processing the content of the print job. For example, this could include, adding letterheads; adding a watermark; adding text overlays; adding unique numbers or barcodes; adding DLP marks, and so on.

The above list of example print workflows is not exhaustive, there are many other print workflows that could be used. Moreover, in an alternative embodiment, some or all of the workflows described above as being performed by the print server 120 could be performed by the cloud service 150.

The print server 120 may also be configured to perform workflows that are unrelated to printing. For example, the print server 120 may be configured to archive the received documents (based on the print job), or send a PDF (based on the print job) to other local systems, which may include sending to a "hot folder".

As described in the above embodiment, print jobs that are sent to the cloud service 150 are automatically transferred to the print server 120 for subsequent release. This means that the print server 120 can always accurately perform budget control, even when a print job is initially sent to the cloud service 150 for processing. As described above, the cloud service often offers methods of print submission that are not available to the print server 120. Furthermore, often the cloud service 150 can interact with more software applications than the local print server 120. Thus, the embodiment provides the combined advantage of increased usability of the use of the cloud service 150 by a user, with the accurate budget control by the print server 120. Furthermore, as discussed above the print server 120 may be configured to perform one or more other print workflows, or even workflows not related to printing.

Alternative Embodiment

It has been described above that the print data is sent from the client computer 100 to the cloud service 150 for storage in the print queue 507, but this is not necessary. In an alternative embodiment, the print data may be stored and spooled on the client computer 100 which has as part of its software a program called "smart client". The smart client can take over typical print server tasks such as print job spooling, storage of attribute information of the print jobs and provision of print job lists to a printer. The smart client is configured to control the printing behaviour of the client computer 100. FIG. 8 shows a sequence diagram illustrating a printing method performed according to this alternative embodiment.

In FIG. 8, steps S801 and S806 to S813 are essentially the same as steps S701 and S705 to S712, respectively, described in relation to FIG. 7. Accordingly, repetition of a description of these steps will be avoided, and only those steps in FIG. 8 that differ from those in FIG. 7 will be described.

In step S802, print data is spooled in the client computer 100 and stored in a client print queue within the client computer software. The client print queue may be part of a print driver software installed on the client computer 100, or part of the smart client software installed on the client computer 100. In step S803 the client computer 100 sends an access request to the cloud service 150. The access request includes user identification and authentication information which is processed by the user access function 505 of the cloud service 150. The user access function 505 checks the received identification and authentication information against the information stored in the synchronized database of the user access function 505. If the information corresponds to that of a registered user, the access request is successful. If the user access request is successful, the client computer 110 sends a request to register a print job in the cloud service 150. The request includes only attribute information (metadata about the print job). The information about the content to be printed (print data) is not transmitted to the cloud service 150.

In step S804 the cloud service 150, which has previously been instructed to send print jobs to the printer server 120 based on the transfer information stored in step S605 (described in relation to FIG. 6), instructs the client computer 100 to transfer the print job to the print server 120.

In step S805 the print job that is spooled in the client print queue is transferred to the cloud service 150, and then transferred from the cloud service 150 to the print server 120. In step S806 the transferred print job is stored in the print queue 503 of the print server 120. The transferred print job that is included in the client print queue is deleted.

The timing of the transfer instruction in step S804 and the timing of the transfer of the print job in step S805 may be as soon as the cloud service 150 registers the print job in step S803. Alternatively, the timing of steps S804 and S805 may be set to be performed a certain time intervals, or when each of the client computer 100, cloud service 150 and print server 120 are connected.

In step S805 it is described above that the print job is first sent to the cloud service 150 before being sent to the print server 120. In this case the print job is not stored in the print queue 507 of the cloud service 150, but it may be temporarily stored in a "working memory", or buffer, of the cloud service 150 before being sent to the print server 120. Although, it is described that the client 100 sends the print job to the cloud service 150 (which then sends the print job to the print server 120), the client 100 may instead send the print job directly to the print server 120.

In the above-described alternative embodiment, a single print job is described, but the method is equally applicable to a plurality of print jobs. In this case, in step S805 a plurality of print jobs are sent to the print server 120.

The above-described alternative embodiment is also equally applicable to the additional print workflows, and non-printing workflows discussed above.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present invention has been described with reference to embodiments, it is to be understood that the invention is not limited to the disclosed embodiments.

The invention claimed is:

1. A printing system comprising:
a cloud service connected to a first network and a second network and including a first print job queue for storing print jobs for printing;
a print server connected to the first network and including a second print job queue for storing print jobs for printing;
a client computer connected to the second network, and configured to send print information to the cloud service via the second network in accordance with a print instruction for printing a document received from a user using the client computer;
wherein the cloud service is configured to create a print job from the print information received from the client computer, store the print job in the first print queue, and send the print job stored in the first print queue to the print server via the first network,
wherein the print server is configured to receive the print job from the cloud service via the first network and store the print job in the second print queue,
wherein the cloud service is configured to determine whether the print job stored in the first print queue is to be sent to the print server according to transfer information stored in the cloud service,
wherein the transfer information is set by an administrator, the transfer information indicates whether all print jobs for a user stored in the first print queue are to be sent to the print server, or whether only certain print jobs for a user stored in the first print queue are to be sent to the print server, and
wherein the transfer information is also stored in the print server and
once the print job is stored in the second print queue, the print server is subsequently configured to perform one or more of the following workflows:
release the print job at a printer,
delete the print job,
applying budget control to the print job,
convert the print job to PCL data,
notify the user that the print job is ready for release at a printer,
checking properties of the print job against a print policy,
route the print job to another print server,
delegate the print job to a person or group/department,
apply a customer specific billing process to the print job,
print the print job on multiple printers in parallel,
manipulate the print job,
process the print job to add information
archive the print job,
send the print job to another local system, and
processing by customer configured workflow/workflow editor.

2. The printing system according to claim 1, wherein the cloud service is configured to delete the print job from the first print queue after the print job has been sent to the print server.

3. The printing system according to claim 1, wherein the print server is configured to determine whether the print job stored in the first print queue is to be sent to the print server according to transfer information stored in the print server, and if the transfer information indicates that the print job is to be sent, the print server is configured to send a request to the cloud service via the first network for the print job stored in the first print queue.

4. The printing system according to claim 1, wherein a timing when the cloud service sends the print job stored in the first print queue to the print server is at a predetermined timing.

5. The printing system according to claim 1, wherein the print information includes print data and attribute information relating to the document to be printed, and the cloud service is configured to use the print data and attribute information to create the print job.

6. A printing method in a printing system including a cloud service connected to a first network and a second network and including a first print job queue for storing print jobs for printing, a print server connected to the first network and including a second print job queue for storing print jobs for printing, and a client computer connected to the second network, the method comprising:
 sending print information to the cloud service via the second network in accordance with a print instruction for printing a document received from a user using the client computer;
 creating a print job from the print information;
 storing the print job in the first print queue;
 sending the print job stored in the first print queue to the print server via the first network; and
 storing the print job in the second print queue,
 wherein the cloud service is configured to determine whether the print job stored in the first print queue is to be sent to the print server according to transfer information stored in the cloud service,
 wherein the transfer information is set by an administrator, the transfer information indicates whether all print jobs for a user stored in the first print queue are to be sent to the print server, or whether only certain print jobs for a user stored in the first print queue are to be sent to the print server, and
 wherein the transfer information is also stored in the print server and
 once the print job is stored in the second print queue, the print server is subsequently configured to perform one or more of the following workflows:
  release the print job at a printer,
  delete the print job,
  applying budget control to the print job,
  convert the print job to PCL data,
  notify the user that the print job is ready for release at a printer,
  checking properties of the print job against a print policy,
  route the print job to another print server,
  delegate the print job to a person or group/department,
  apply a customer specific billing process to the print job,
  print the print job on multiple printers in parallel,
  manipulate the print job,
  process the print job to add information
  archive the print job
  send the print job to another local system, and
  processing by customer configured workflow/workflow editor.

7. The method according to claim 6, further comprising deleting the print job from the first print queue after the print job has been sent to the print server.

8. The method according to claim 6, further comprising:
 determining whether the print job stored in the first print queue is to be sent to the print server according to transfer information stored in the print server, and
 if the transfer information indicates that the print job is to be sent, sending a request to the cloud service via the first network for the print job stored in the first print queue.

9. The method according to claim 6, wherein the timing when the print job stored in the first print queue is sent to the print server is at a predetermined timing.

10. The method according to claim 6, wherein the print information includes print data and attribute information relating to the document to be printed, the step of creating the print job includes the use of the print data and attribute information to create the print job.

11. A non-transitory computer-readable storage medium storing a program that when executed on a computer causes the computer to perform a method according to claim 6.

12. A printing system comprising:
 a cloud service connected to a first network and a second network;
 a client computer connected to the second network and including a first print job queue for storing print jobs for printing, and configured to send print attribute information to the cloud service via the second network in accordance with a print instruction for printing a document received from a user using the client computer;
 a print server connected to the first network and including a second print job queue for storing print jobs for printing;
 wherein the client computer is configured to create a print job in accordance with the print instruction, store the print job in the first print queue, and send the print job stored in the first print queue to the print server via the first and second networks,
 wherein the print server is configured to receive the print job from the client computer via the first network and store the print job in the second print queue,
 wherein the cloud service is configured to determine whether the print job stored in the first print queue is to be sent to the print server according to transfer information stored in the cloud service,
 wherein the transfer information is set by an administrator, the transfer information indicates whether all print jobs for a user stored in the first print queue are to be sent to the print server, or whether only certain print jobs for a user stored in the first print queue are to be sent to the print server, and
 wherein the transfer information is also stored in the print server and
 once the print job is stored in the second print queue, the print server is subsequently configured to perform one or more of the following workflows:
  release the print job at a printer,
  delete the print job,
  applying budget control to the print job,
  convert the print job to PCL data,
  notify the user that the print job is ready for release at a printer,
  checking properties of the print job against a print policy,
  route the print job to another print server,
  delegate the print job to a person or group/department,
  apply a customer specific billing process to the print job,
  print the print job on multiple printers in parallel,
  manipulate the print job,
  process the print job to add information
  archive the print job,
  send the print job to another local system, and
  processing by customer configured workflow/workflow editor.

13. A printing method in a printing system including a cloud service connected to a first network and a second network, and a client computer connected to the second network and including a first print job queue for storing print jobs for printing, and a print server connected to the first network and including a second print job queue for storing print jobs for printing, the method comprising:

sending print attribute information to the cloud service via the second network in accordance with a print instruction for printing a document received from a user using the client computer;

creating a print job in accordance with the print instruction;

storing the print job in the first print queue;

sending the print job stored in the first print queue to the print server via the first and second networks; and storing the print job in the second print queue, wherein the cloud service is configured to determine whether the print job stored in the first print queue is to be sent to the print server according to transfer information stored in the cloud service, wherein the transfer information is set by an administrator, the transfer information indicates whether all print jobs for a user stored in the first print queue are to be sent to the print server, or whether only certain print jobs for a user stored in the first print queue are to be sent to the print server, and wherein the transfer information is also stored in the print server and once the print job is stored in the second print queue, the print server is subsequently configured to perform one or more of the following workflows:

release the print job at a printer, delete the print job, applying budget control to the print job, convert the print job to PCL data, notify the user that the print job is ready for release at a printer, checking properties of the print job against a print policy, route the print job to another print server, delegate the print job to a person or group/department, apply a customer specific billing process to the print job, print the print job on multiple printers in parallel, manipulate the print job, process the print job to add information archive the print job, send the print job to another local system, and processing by customer configured workflow/workflow editor.

* * * * *